(12) United States Patent
Bose et al.

(10) Patent No.: US 9,792,349 B2
(45) Date of Patent: *Oct. 17, 2017

(54) IN-DATABASE SHARDED QUEUE

(71) Applicant: Oracle International Corporation, Redwood Shores, CA (US)

(72) Inventors: Shubha Bose, Karnataka (IN); Devendra Singh, Karnataka (IN); Neerja Bhatt, Sunnyvale, CA (US); Sujatha Janardhanan, Foster City, CA (US); Gaurav Garg, Santa Clara, CA (US); Yang Seok Ki, Palo Alto, CA (US); Abhishek Saxena, Cupertino, CA (US); Alan Downing, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 14/095,543

(22) Filed: Dec. 3, 2013

(65) Prior Publication Data

US 2014/0372486 A1    Dec. 18, 2014

Related U.S. Application Data

(60) Provisional application No. 61/834,246, filed on Jun. 12, 2013.

(51) Int. Cl.
*G06F 17/30* (2006.01)
(52) U.S. Cl.
CPC .. *G06F 17/30595* (2013.01); *G06F 17/30575* (2013.01); *G06F 17/30607* (2013.01)

(58) Field of Classification Search
CPC .. G06F 15/173; G06F 9/542; G06F 17/30321; G06F 11/3034
See application file for complete search history.

(56) References Cited

U.S. PATENT DOCUMENTS 8,037,024 B1    10/2011  Bozkaya
8,489,820 B1    7/2013   Ellard
(Continued)

OTHER PUBLICATIONS

Kejser, Thomas, "Table Pattern: Database Message Queues", dated May 25, 2012, 10 pages.
U.S. Appl. No. 14/165,974, filed Jan. 28, 2014, Notice of Allowance, mailed Jul. 1, 2016.
(Continued)

*Primary Examiner* — Mariela Reyes
*Assistant Examiner* — Courtney Harmon
(74) *Attorney, Agent, or Firm* — Hickman Palermo Becker Bingham LLP

(57) ABSTRACT

A method and apparatus for an in-database sharded queue that supports JMS session ordering is provided. Messages from a plurality of enqueuers are stored in a plurality of shards of a particular queue. For each enqueuer, all messages are stored in only one of the shards. Each shard includes one or more subshards, each subshard having one or more partitions of a queue table maintained by a relational database system. All messages from a first enqueuer are stored in partitions of the queue table that are assigned to a first shard of the plurality of shards. All messages from a second enqueuer are stored in partitions of the queue table that are assigned to a second shard of the plurality of shards. Subscribers of the particular queue are caused to dequeue messages from the plurality of shards.

26 Claims, 8 Drawing Sheets

(56) References Cited

U.S. PATENT DOCUMENTS

| | | | |
|---|---|---|---|
| 8,959,067 B1* | 2/2015 | Patiejunas | G06F 17/30377 |
| | | | 707/696 |
| 2002/0099697 A1* | 7/2002 | Jensen-Grey | G06F 17/3002 |
| 2002/0186656 A1 | 12/2002 | Vu | |
| 2006/0069605 A1* | 3/2006 | Hatoun | G06Q 10/06 |
| | | | 705/7.15 |
| 2006/0218560 A1 | 9/2006 | Dadiomov et al. | |
| 2007/0101341 A1* | 5/2007 | Downing | G06F 9/542 |
| | | | 719/314 |
| 2009/0133023 A1 | 5/2009 | Li | |
| 2010/0198920 A1* | 8/2010 | Wong | G06F 9/544 |
| | | | 709/206 |
| 2010/0281491 A1* | 11/2010 | Surlaker | G06F 9/546 |
| | | | 719/314 |
| 2011/0099233 A1* | 4/2011 | Calder | G06F 9/546 |
| | | | 709/206 |
| 2011/0202929 A1* | 8/2011 | Schleimer | G06F 17/30474 |
| | | | 718/106 |
| 2014/0040040 A1* | 2/2014 | Townsend | G06Q 30/0279 |
| | | | 705/14.66 |
| 2014/0067940 A1* | 3/2014 | Li | G06F 17/30 |
| | | | 709/204 |
| 2014/0372489 A1 | 12/2014 | Jaiswal et al. | |
| 2014/0372702 A1 | 12/2014 | Subramanyan et al. | |

OTHER PUBLICATIONS

Jaiswal, U.S. Appl. No. 14/095,734, filed Dec. 3, 2013, Interview Summary, mailed Mar. 2, 2017.
Jaiswal, U.S. Appl. No. 14/095,734, filed Dec. 3, 2013, Final Office Action Action, mailed Jan. 6, 2017.

* cited by examiner

IN-DATABASE SHARDED QUEUE

CROSS-REFERENCE TO RELATED APPLICATIONS; BENEFIT CLAIM

This application claims the benefit of Provisional Appln. 61/834,246 filed Jun. 12, 2013, entitled "An In-Database Sharded Queue That Supports JMS Session Ordering", the entire contents of which is hereby incorporated by reference as if fully set forth herein, under 35 U.S.C. §119(e).

FIELD OF THE INVENTION

The present invention relates to queues and, more specifically, to sharded queues implemented in a database system.

BACKGROUND

In many applications, it is necessary for one process (computer program, module, or thread) executing on a computer system to communicate with one or more other processes executing on the same or other computer systems. The mechanism used to carry out these communications varies from system to system.

One mechanism that has facilitated process-to-process communication in a variety of systems is a "message queue". As illustrated in FIG. 1, to use a conventional message queue, processes ("enqueue sessions") send information to other processes ("dequeue sessions") by placing messages in a message queue 100. The dequeue sessions obtain the information from the enqueue sessions by reading the messages from the message queue 100. When all dequeue sessions that need to read a given message from the message queue 100 have read the given message, the message is removed from the message queue 100. Implementations of message queues are described in U.S. Pat. Nos. 7,181,482, 7,185,033, 7,185,034, 7,203,706, 7,779,418, 7,818,386, 7,680,793, 6,058,389, and 8,397,244, the contents of all of which are incorporated herein by reference.

Unfortunately, conventional implementations of message queues do not scale well. Specifically, as the number of dequeue sessions increases, the contention for the "hot" messages at the head of the queue increases, thereby degrading performance. In addition, when the enqueue sessions and dequeue sessions are spread across several systems, the amount of communication on the interconnect between the systems can become excessive.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for using "sharded queues" to communicate messages between processes. Similar to conventional queuing systems, enqueue sessions add messages to a sharded queue, and dequeue sessions consume messages from the sharded queue. However, a single sharded queue is implemented by a plurality of shards, and a message may be placed in a particular queue by placing the message in any one of the shards that implement that particular queue.

In one embodiment, to reduce contention among the enqueue sessions, each enqueue session is assigned to only one of the shards. Thus, contention among enqueue sessions is limited to those enqueue sessions assigned to the same shard, and not to all enqueue sessions that are posting messages to the queue.

Subscribers that consume messages from a particular sharded queue must dequeue messages from all shards of that particular sharded queue. For environments with a single database instance, a subscriber may have a single dequeue session that dequeues messages from all shards. For environments where multiple database instances are sharing the same persistent storage, a subscriber may have multiple dequeue sessions, each of which dequeues only from the shards that have affinity to the instance containing the dequeue session. Dequeue sessions use a dequeue log to track the progress of their dequeuing operations. In one embodiment, both the sharded queue and the dequeue log are implemented using partitioned tables. Specifically, each shard is implemented using one or more partitions of a queue table, and each subscriber has a partition of a dequeue log table for each partition of the queue table.

Messages

A message is data to be communicated via a queue. In one embodiment, a message includes a set of metadata and a payload. Each message is uniquely identified by a corresponding message identifier. The payload of a message is the data in the message. In one embodiment, each payload has associated metadata that is stored outside the payload in a message handle. Payloads can be of different sizes. As shall be explained in greater detail hereafter, the size of a payload may be a factor in determining whether the payload is stored in-line, out-of-line or in a database table (not cached) and the available memory may determine whether the message is cached at all.

Sharded Queues

Figure 1:
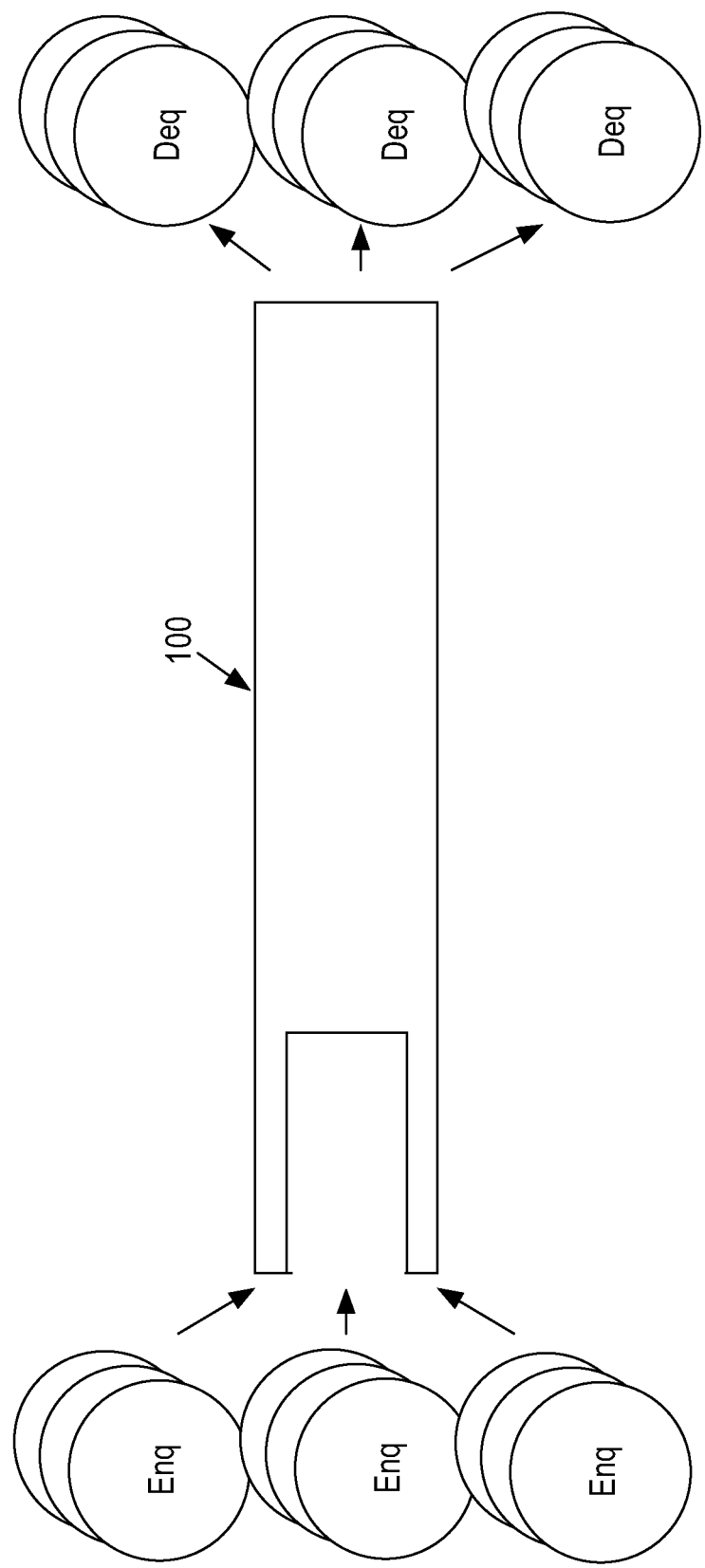
FIG. 1 is a block diagram of a conventional message queue.
Figure 2:
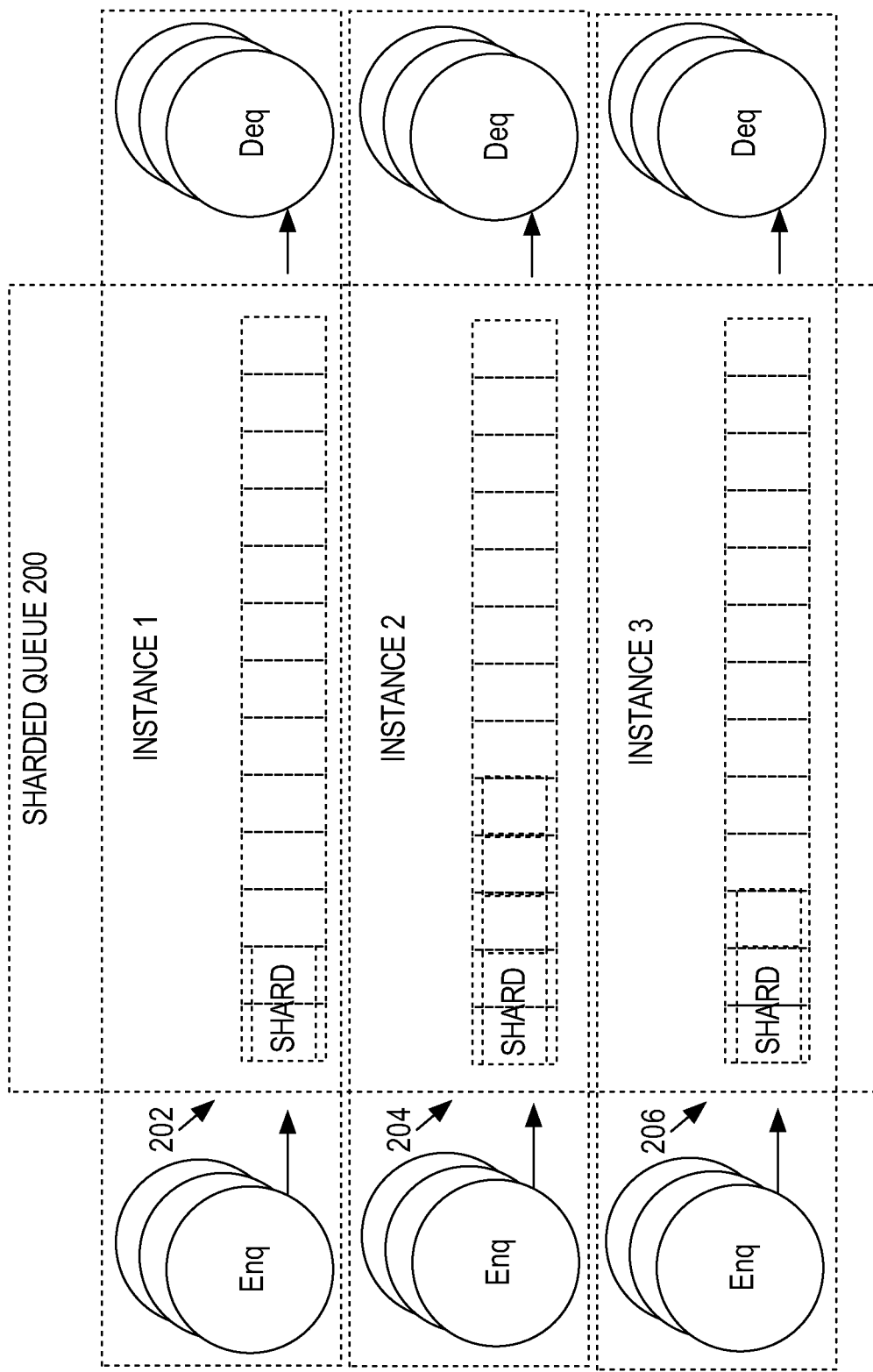
FIG. 2 is a block diagram of a sharded queue, according to an embodiment.

FIG. 2 is a block diagram of a sharded queue 200, according to an embodiment. Referring to FIG. 2, sharded queue 200 is composed of multiple shards 202, 204 and 206. While in the illustrated embodiment, sharded queue 200 has three shards, the actual number of shards used to implement a sharded queue may vary from implementation to implementation. For example, in one embodiment, the number of shards for a sharded queue can be specified by an administrator. In an alternative embodiment, lower and upper bounds may be specified, and the system can dynamically vary the number of shards available for enqueue.

In the illustrated embodiment, the shards that belong to queue 200 are maintained separate from each other, and may be managed by different database servers. In the example illustrated in FIG. 2, shards 202, 204 and 206 are respectively maintained by distinct instances 1, 2 and 3 of a database server. While the illustrated embodiment shows one shard in each database server instance, there is no limit to the number of shards, of a given sharded queue, that any database service instance may have.

Shards 202, 204 and 206 store distinct sets of messages for the same sharded queue 200. In the embodiment illustrated in FIG. 2, shard 202 stores messages, of sharded queue 200, that are enqueued by enqueue sessions that are executing in instance 1. Similarly, shard 204 stores messages, of sharded queue 200, that are enqueued by enqueue sessions that are executing in instance 2, and shard 206 stores messages, of sharded queue 200, that are enqueued by enqueue sessions that are executing in instance 3.

The Queue Table

Figure 3:
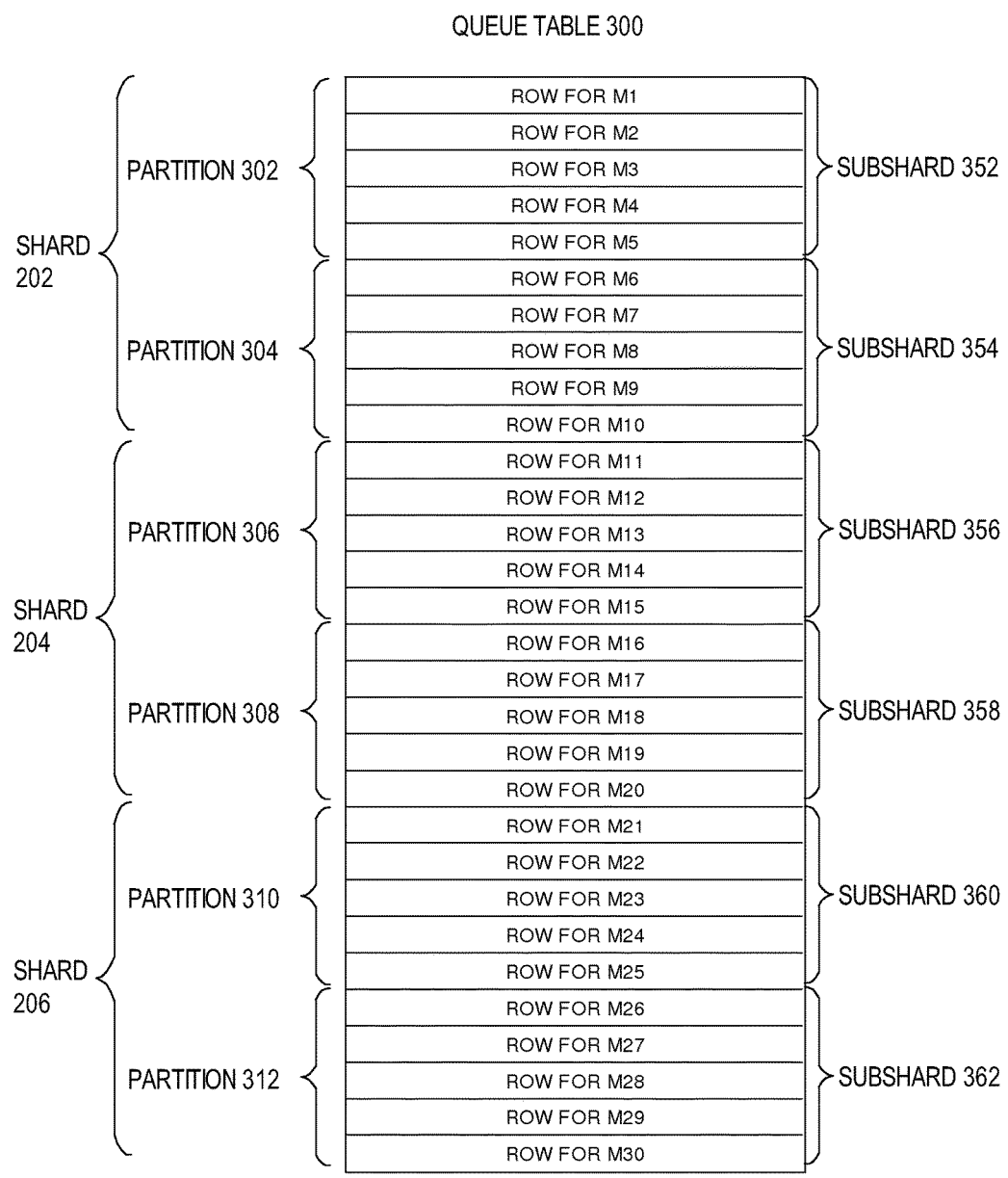
FIG. 3 is a block diagram illustrating how a sharded queue may be implemented using a partitioned queue table, according to an embodiment.

According to one embodiment, sharded queue 200 is implemented using a partitioned queue table 300, as illustrated in FIG. 3. Referring to FIG. 3, queue table 300 is divided into six partitions 302, 304, 306, 308, 310 and 312. Each shard of queue 200 is currently assigned two of the partitions of queue table 300. Specifically, shard 202 is assigned partitions 302 and 304, shard 204 is assigned partitions 306 and 308, and shard 206 is assigned partitions 310 and 312.

While, for the purpose of illustration, each shard of sharded queue 200 has two partitions of queue table 300, the number of partitions used by each shard may vary based on a variety of factors, including the rate at which enqueuers are enqueuing messages to each shard, and the rate at which dequeuers are dequeuing messages from each shard. Thus, the number of partitions in any given shard may vary over time, with new partitions being added when enqueuers run out of storage for new messages, and partitions being dropped as dequeuers finish dequeuing all messages in a partition.

In the illustrated embodiment, each partition has five rows of the queue table 300. However, in typical implementations, the number of rows in each partition may vary. For example, some partitions may have tens of thousands of rows.

Because queue 200 is implemented using a partitioned table, enqueuing a persistent message involves inserting a row into a partition of queue table 300. For example, an enqueue session executing in instance 1 would enqueue a message in queue table 300 by inserting a row that corresponds to the message into a partition associated with shard 202, such as partition 302 or partition 304 of queue table 300. In one embodiment, shard 202 is configured maintain a current insertion point such that messages are inserted into one of the associated partitions 302-304 based on the current insertion point of shard 202.

In an embodiment that shall be described in greater detail hereafter, the operations performed on queue table 300 include SQL INSERTs (to enqueue messages), SQL SELECTs (for dequeuing messages with large message payloads), and partition-level SQL TRUNCATEs (in the background to discard messages that are no longer needed).

Queue Table Partitions

As mentioned above, queue table 300 is partitioned. At any given time, a queue table partition is either assigned to a specific shard, or is in a "free pool" of queue table partitions maintained for the sharded queue. When a queue table partition has been processed by all relevant subscribers, the queue table partition is added to the free pool. When additional storage is needed for a specific shard, then a queue table partition is removed from the free pool and assigned to the shard. When reused in this manner, the same queue table partition may be assigned to different shards, of the same sharded queue, at different points in time.

If additional storage is needed for a specific shard and the free pool is empty, then a new queue table partition is created and assigned to the shard.

Subshards

Each shard may be divided into one or more subshards. A subshard is a subset of the queue table rows that have been assigned to a shard. In one embodiment, each subshard of a given shard is assigned one or more queue table partitions that have been assigned to the given shard. In another embodiment, a single queue table partition can be assigned to multiple subshards. In alternative embodiments, the shards are divided into subshards without respect to the partitioning of queue table 300. Thus, the relationship between subshards and queue table partitions may be one-to-many, one-to-one, many-to-one, or there may be no particular relationship at all. Within a subshard, messages are ordered by enqueue-time. Subshards of a shard are themselves also ordered by enqueue-time. Thus, a dequeue session can access the messages of each enqueuer in enqueue-time order, due to enqueuer affinity between an enqueue session and a shard, When the partitions of the queue table are used to establish subshards, the number of queue table partitions assigned to any given subshard may vary. For example, a shard may have one subshard with three queue table partitions, and another subshard with five queue table partitions.

For the convenience of explanation, it shall be assumed that subshards include a single partition of the queue table. Under this assumption, each of shards 202, 204 and 206 has two subshards. The mapping between shards, queue table partitions, and subshards is illustrated in FIG. 3.

Specifically, the partitions 302 and 304 that belong to shard 202 correspond to subshards 352 and 354. The partitions 306 and 308 that belong to shard 204 correspond to subshards 356 and 358. The partitions 310 and 312 that belong to shard 206 correspond to subshards 360 and 362.

Queue Table Rows

Each row in the queue table corresponds to a persistent message that has been enqueued in the sharded queue associated with the queue table. In the embodiment illustrated in FIG. 3, partition 302 has one row for each of messages M1 to M5, partition 304 has one row for each of messages M6 to M10, partition 306 has one row for each of messages M11 to M15, partition 308 has one row for each of messages M16 to M20, partition 310 has one row for each of messages M21 to M25, and partition 312 has one row for each of messages M26 to M30.

According to one embodiment, within queue table 300, the row for a given message includes the following information for the message:
MSGID—Message identifier.
SEQ_NUM—Sequence number from message id
CORRELATION—Correlation id
ENQUEUE_TIME—Enqueue time of the message
PRIORITY—Priority value of the message
EXPIRATION—Expiration time of the message
STATE—Message state.
SUBSCRIBER_MAP—Subscriber bitmap. This column is NULL for a single consumer queue.
USER_PROPERTIES_TEXT—Java Message Service (JMS) user properties in text (in case property size is less than or equal to 4000 bytes.)
USER_PROPERTIES_CLOB—JMS user properties in LOB (in case the property size is greater than 4000 bytes)
USERDATA_RAW—Message payload (when size is less than or equal to 2000 bytes)
USERDATA_BLOB—Message payload (when size is greater than 2000 bytes)

When implemented as a queue for Java Message Service (JMS) messages, each queue table row may also have the following information:
JMS_MSG_TYPE—Indicates JMS message type (e.g. text, bytes, stream, map, etc.)
HEADER_PROPERTIES—JMS header properties The Message Identifier In one embodiment, the message identifier of each message is unique relative to all other messages in the sharded queue. Similar to a ROWID of a database table row, the message id is used for navigation within the queue.

For example, in one embodiment, the message identifier may have the following fields:
subshard id
shard id
priority
endian
sequence Subshard id represents the unique number associated with a subshard within a shard. Shard id represents the unique number associated with the shard in which the message is placed.

Priority represents the priority values associated with the message. The field endian represents the endian of the platform on which the database is installed. This field is used to ensure correct representation of message-id in-memory as well as in queue tables. The sequence field identifies a message within the subshard.

Selection Conditions

A queue that has multiple subscribers is referred to as a multi-consumer queue. Every subscriber to a multi-consumer queue is not necessarily interested in all messages that are enqueued in the queue. Thus, each subscriber may have a rule that indicates selection conditions. During the dequeuing operation, the messages that satisfy the selection conditions of the subscriber are to be consumed by the subscriber, and messages that do not satisfy the selection conditions of the subscriber are to be skipped by the subscriber. In one embodiment:
"rule condition" refers to a combination of Boolean SQL expressions that is allowed in a WHERE clause of a SELECT statement
"rule" refers to a single embodiment of a single rule condition
"rule set" refers to a set of rules that can be evaluated together.

A rule set evaluation results in a set of rules which evaluated to TRUE. A rule set is associated with a queue, and each rule corresponds to a subscriber. The rule set evaluation for a message results in a set of subscribers which should be able to dequeue the message.

As shall be described in greater detail hereafter, the subscriber bitmap of a message is used to indicate the subscribers whose selection conditions are satisfied by the message. The actual rule set evaluation to determine which subscribers are to consume a given message may be performed by the enqueuing sessions as they enqueue messages, in a background process, or by the dequeuing sessions as they dequeue messages.

The Subscriber Map

The SUBSCRIBER_MAP column of each row stores a subscriber bitmap that indicates which subscribers have selection conditions that are satisfied by the message. The SUBSCRIBER_MAP may be NULL for a single consumer queue shard, e.g. a queue shard with one subscriber. According to one embodiment, the subscriber bitmap is used in conjunction with a "lock" bitmap. A bit position on the subscriber bitmap and the same bit position on the lock bitmap together indicate the state of the message for the particular subscriber that corresponds to the position.

Specifically, the subscriber bitmap represents all subscribers to which this message is visible. The lock bitmap represents the lock status of a subscriber for this message. In one embodiment, a bit position is assigned to each subscriber, such as when the subscription between a subscriber and a queue shard is created. For example, the subscriber bitmap and the lock bitmap for a shard contains information for a specific subscriber at the bit position assigned to the specific subscriber. The assignment of bit positions may be stored in another data structure. When a subscription terminates, the data structure storing the assignment of bit positions is updated. The bit position may be assigned on a per-shard basis such that a subscriber may have a different bit position with respect to different queue shards.

Subscriber bit=0 and Lock bit=0 means the message cache (to be described in greater detail hereafter) cannot process this message because it has not been determined whether the message satisfies the selection conditions of the subscriber.

Subscriber bit=1 and Lock bit=0 means this message is valid for this subscriber (i.e. satisfies the selection conditions of the subscriber) and no other dequeue for the same subscriber is working on this message yet.

Subscriber=1 and Lock bit=1 means this message is valid for this subscriber and a dequeue process for this subscriber has already locked it.

Subscriber=0 and Lock bit=1 means the subscriber finished the processing of this message and committed the dequeue.

As mentioned above, the subscriber bitmap for a message may be set by
- the enqueue session at the time the message is enqueued,
- a background process after the message is enqueued and before the message is processed by any dequeue session, or
- dequeue sessions at the time the message is processed by the dequeue session.

Regardless of the entity that generates the bitmap, the entity evaluates the selection conditions of each subscriber against the message. The bits within the bitmap that correspond to each subscriber are then set based on whether the message satisfies the selection conditions. In the case where the bitmap is set by a dequeue session, the first dequeue session to process the message may set the bitmap for all subscribers so that subsequent dequeue sessions merely need to inspect the bitmap. In an alternative embodiment, each dequeue session may evaluate the message only relative to its own selection conditions, and only set the bits of the bitmap that correspond to its subscriber.

Message Cache

To avoid the overhead associated with accessing queue table 300 every time a persistent message needs to be dequeued by a subscriber, a message cache is maintained in volatile memory. Using the message cache avoids costly SQL operations to access queued messages. When sufficient memory is available, the message cache caches all messages in sharded queues on a database instance, which includes messages and any metadata, locks, subscribers, and transaction states needed to manage the messages.

The message cache provides a fast in-memory access path to all queuing functionality including enqueue, dequeue, and notification so that clients of the message cache do not need to read, sort, and lock data in database tables.

Message Cache Structure

According to one embodiment, the message cache is a specific in-memory structure that stores active messages in order to avoid costly SQL operations. Most queue operations will take place in memory and experience minimum disk latency if there is shared memory available.

Each message cache contains a well-organized set of data structures to store and retrieve persistent and non-persistent messages and the associated metadata. According to one embodiment, a message cache is created per queue per instance.

The message cache can be accessed via queue metadata. According to one embodiment, each message cache can contain two types of messages: persistent and non-persistent messages. Persistent messages will persist in the message cache and in a database table until they are consumed and removed. On the other hand, a non-persistent message will be present only in the message cache and not in a database table.

According to one embodiment, a buffer is used to represent each subshard in the message cache. In one embodiment, the buffer is a circular buffer. The virtue of a circular structure is the ease of memory reusability; the circular structure can simplify the garbage collection process and reduce the potential memory fragmentation. Messages of a subshard are arranged in the circular buffer according to their enqueue time, the data structure being a good match for the message ordering scheme.

A circular buffer can cache a part of a subshard or a whole subshard. According to one embodiment, there is 1:1 mapping between circular buffers and subshards. For each message in a subshard, the corresponding circular buffer contains either the whole message, metadata only (if the payload is too big), or nothing (in case of memory shortage). At any given time, a circular buffer can store messages from multiple transactions, and the messages of any given transaction can span multiple buffers. In one embodiment, if a rollback of a transaction occurs, no attempt is made to immediately reuse the memory allocated for the transaction; the allocated memory is recycled when the entire circular buffer is recycled and/or deallocated, as shall be described in greater detail hereafter.

Circular Buffers

As mentioned above, each subshard corresponds to at least one circular buffer in the message cache. The subshard contains a pointer to its circular buffer. The circular buffer is a list of chunks which form a circular list. The circular buffer size can vary from one subshard to another, depending on the size of each message.

When a new subshard is allocated in the message cache, a circular buffer includes an initial number of chunks of memory that are allocated for storing new messages. When there is no more memory in the currently allocated chunks to store a new message, at least one new chunk is allocated to the circular buffer of the subshard provided more messages can be stored in the subshard and memory is available. The memory used by the circular buffer that corresponds to a subshard is freed when dequeue for the subshard has been completed by all subscribers.

Figure 4:
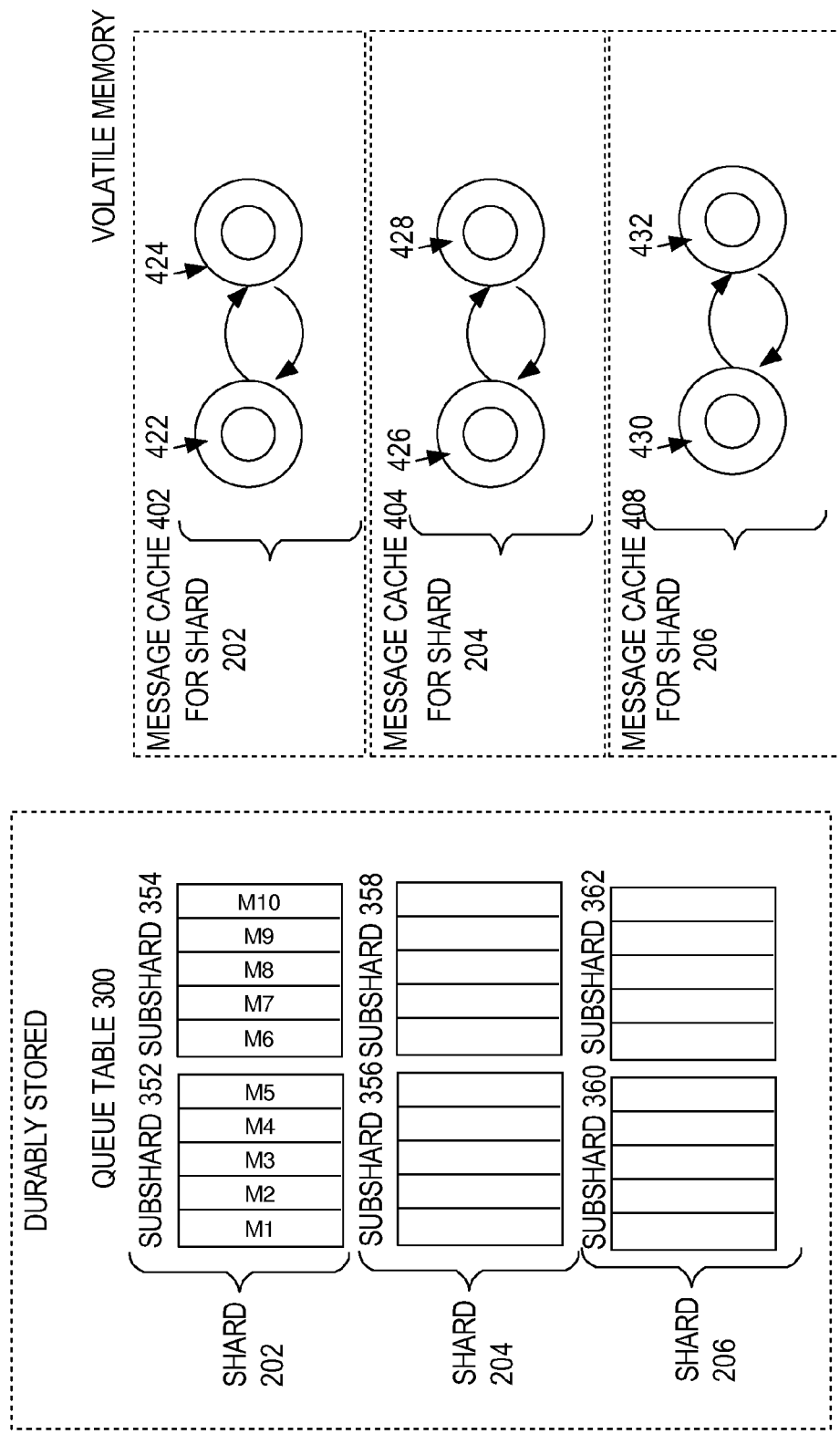
FIG. 4 is a block diagram illustrating message caches, according to an embodiment.

Referring to FIG. 4, it illustrates message caches 402, 404 and 406 that store cache entries for the shards of sharded queue 200. Specifically, message caches 402, 404 and 406 respectively store cache entries for shards 202, 204 and 206.

Each of the message caches 402, 404 and 406 stores a circular buffer for each of the subshards in the shard associated with the message cache. Specifically, in the illustrated embodiment, message cache 402 includes circular buffers 422 and 424 that respectively correspond to subshards 352 and 354 of shard 202. Message cache 404 includes circular buffers 426 and 428 that respectively correspond to subshards 356 and 358 of shard 204. Message cache 406 includes circular buffers 430 and 432 that respectively correspond to subshards 360 and 362 of shard 206.

Depending on the size, payloads can be stored in-line, out-of-line or not cached. In one embodiment, if payloads are smaller than a first threshold size, they are stored in-line. This means that payloads are stored in the entry, within the circular buffer, that corresponds to the message. The payload starts at an offset into the circular buffer.

If payloads are larger than the first threshold size, they are stored out-of-line. This means that payloads are not stored in the entry, within the circular buffer, that corresponds to the message. Instead, the entry will have an in-memory message handle that contains a pointer to the in-memory location which contains the payload.

According to one embodiment, if messages are larger than a second, higher threshold, then the messages are not cached. To avoid fragmentation and memory pressure within the message cache, large payloads greater than the second threshold (e.g. size >4k) are stored only in database tables. They are fetched from the table with SQL during dequeue.

Enqueuing Messages

When first enqueuing to a sharded queue, an enqueue session chooses a shard associated with the queue and always uses the same shard. The enqueue affinity ensures session ordering requirements are met in the absence of failures because every dequeuer will see the messages each enqueuer enqueued in the correct order.

Enqueuing a persistent message in a sharded queue involves (a) storing a row in the queue table that implements the sharded queue, and (b) adding an entry for the message to the message cache. In one embodiment, a row is stored in the queue table by using SQL to insert a row in a partition of the queue table that implements the sharded queue. Thus, a message may be stored in sharded queue 200 by inserting a row into queue table 300. As shall be described in greater detail hereafter, multiple messages enqueued onto a sharded queue in a transaction become available for dequeue atomically in the message cache as the result of a post-commit callback.

The entry that is added to the message cache for the message initially indicates that the message state is NOT VISIBLE. Thus, the entry will be skipped by any dequeue process that is dequeuing from the circular buffer to which the entry belongs. As shall be explained hereafter, the status is changed to VISIBLE upon the commit of the transaction that is enqueuing the message.

An enqueue session enqueues a message to a shard by enqueuing the message to the latest subshard of the shard. Within a shard, the subshards are ordered by enqueue time, with the latest sub-shard having messages with the most recent enqueue times. Dequeuers navigate the subshards and the messages within the subshards maintaining the enqueue time ordering. To preserve ordering, any given enqueue session enqueues messages to only one shard of a sharded queue.

According to one embodiment, the shard to which an enqueuer is assigned is selected intelligently to improve performance and reduce traffic. Enqueuing a message may involve inserting a row into the corresponding partition on disk. Thus, while new messages may be added to sharded queue 200 by inserting a corresponding row into any of the partitions 302, 304, 306, 308, 310 and 312 of the queue table 300, the specific partition of queue table 300 into which an enqueue session inserts a row is preferably selected based on a variety of factors.

For example, in one embodiment, to reduce traffic on the interconnect between systems, each enqueue session inserts rows only into the queue table partitions that have affinity to the enqueue session. Thus, as shown in FIG. 2, the enqueue sessions executing in instance 1 enqueue messages by inserting rows into the queue table partitions (302 and 304) that implement shard 202. Similarly, the enqueue sessions executing in instance 2 enqueue messages by inserting rows into the queue table partitions (306 and 308) that implement shard 204, and the enqueue sessions executing in instance 3 enqueue messages by inserting rows into the queue table partitions (310 and 312) that implement shard 206.

Enqueue Commit

Conventional relational database mechanisms may be used to commit the rows, associated with newly added messages, to the queue table 300. Upon commit, all rows inserted by a transaction become visible to other transactions, such as the transactions that correspond to dequeuing sessions. However, additional actions must be taken to cause the message cache entries for those new messages to become visible.

For example, according to one embodiment, upon commit of an enqueuing transaction, a post-commit callback is made. The post-commit callback causes the following operations to be performed on the messages in the message cache as part of enqueue commit.

Set the message state to VISIBLE.
Reset the dequeue pointer for all valid subscribers of the first message in the transaction if the dequeue pointer is ahead of it. Dequeue pointers shall be described in greater detail hereafter.

Enqueue Rollback

Under some circumstances, it may not be possible to commit an enqueue transaction. When a transaction cannot commit, all changes made by the transaction have to be rolled back. Conventional relational database mechanisms may be used to roll back the changes made to the queue table 300. However, to undo the changes to the message cache, the following operations are performed on the message as part of enqueue rollback:

Set the message state to INVALID.
For all bit positions of the message: set the subscriber bitmap bit to 0 and lock bitmap bit to 1. This indicates that the message is not of interest to any subscriber, and that the subscriber can move over the message, including the commit low watermark described in the section entitled "COMMIT LOW WATERMARK".

Enqueue Example

Figure 6:
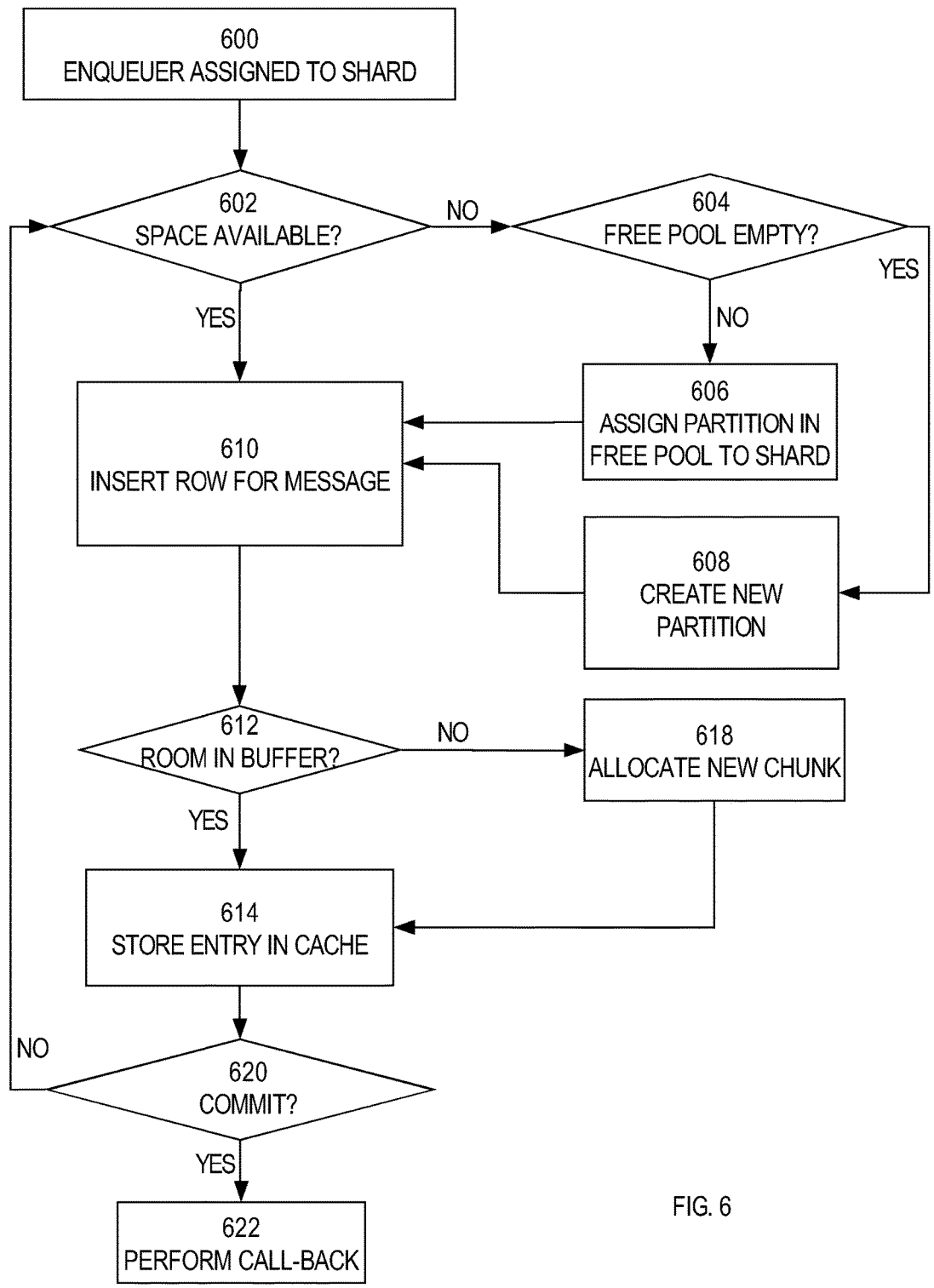
FIG. 6 is a flowchart illustrating steps performed during an enqueue operation, according to an embodiment.

FIG. 6 is a flowchart illustrating steps performed during an enqueue operation to enqueue one or more persistent messages to a sharded queue in a transaction according to one embodiment. Referring to FIG. 6, step 600, the enqueuer is assigned to a shard. As explained above, all messages of any given enqueuer are enqueued to the same shard of the sharded queue. Hence, step 600 is performed only once per enqueuer. For the purpose of illustration, it shall be assumed that, at step 600, an enqueuer X is assigned to shard 202 of sharded queue 200.

At step 602, it is determined whether there is space available, within the queue table partitions currently assigned to shard 202, for the new row. If space is available, control passes to step 610. Otherwise, control passes to step 604 where it is determined whether there is a partition available in the free pool. The free pool shall be described in greater detail hereafter.

If a partition is available from the free pool, then the partition is added to the shard from the free pool (606). Otherwise, a new partition is created and assigned to the shard at step 608. Whether from the free pool or newly created, in an embodiment where each partition is its own subshard, the newly added partition constitutes a new subshard of shard 202.

Continuing with the example, at step 602 it is determined whether subshard 354 is full. If subshard 354 is full, then it is determined whether the free pool has a partition that may be added to shard 202. For the purpose of explanation, it shall be assumed that subshard 354 is not full. Consequently, control proceeds to step 610 where a row for the message is inserted in subshard 354 of queue table 300.

In addition to adding a row for the message to the queue table, a cache entry for the message has to be added to the message cache associated with the shard. In the present example, an entry is added to message cache 402, which is the message cache that corresponds to shard 202.

To add the entry, at step 612 it is determined whether there is room for the entry in the circular buffer, in the message cache, that corresponds to the subshard in which the message was inserted. If not, then at step 618 a new chunk is added to that circular buffer. Once there is space for the new entry in the circular buffer, the entry is stored in the message cache (614).

In the present example, at step 612, it would be determined if circular buffer 424, which corresponds to subshard 354, has space for the new cache entry. For the purpose of explanation, it shall be assumed that there is space in circular buffer 424. Consequently, an entry for the new message is added to circular buffer 424 at step 614.

At this point, neither the table row for the message nor the cache entry for the message is visible to other transactions. The row is not visible because the transaction inserting the row has not committed. Consequently, conventional relational database mechanisms will prevent other transactions from seeing the row. The cache entry is not visible because the message state is not yet set to VISIBLE.

At step 620, it is determined whether the enqueue session is committing. If the enqueue session is committing, at step 622 a call-back is performed. As mentioned above, the call-back involves setting the message state to VISIBLE, resetting the dequeue pointers for all valid subscribers of the first message in the transaction if the dequeue pointer is ahead of it.

On the other hand, if the transaction is not committing, then the enqueue session is enqueuing at least one more message. Consequently, control returns to step 602, where the process is repeated for the next message.

In the present example, it shall be assumed that the enqueue session is committing. Consequently, control proceeds from step 620 to step 622. At step 622, the call-back is performed and the entry, added to circular buffer 424, is marked as VISIBLE. In addition, if any subscribers have dequeue pointers that have passed the position, within buffer 424, of the newly inserted message, those dequeue pointers are reset to the position of the new message.

Order Preservation

According to one embodiment, messages are enqueued and dequeued in sharded queue 200 in such a way as to preserve the ordering of the messages enqueued by each enqueue session, but not the ordering of messages of one enqueue session relative to the messages of other enqueue sessions. Specifically, each enqueue session enqueues messages to only one shard, and within that shard the order of those messages is preserved. When reading from that shard, each dequeue session dequeues in that same order. Therefore, all messages enqueued in the same shard will be dequeued in the same order as they were enqueued.

The fact that each enqueue session enqueues to only one shard ensures session ordering requirements are met, in the absence of failures, because every dequeue session will see the messages each enqueue session enqueued in the correct order.

Subscribers and Dequeue Sessions

A subscriber is an entity that consumes messages. To consume messages, a single subscriber may use any number of dequeue sessions to consume messages from a single queue. In one embodiment, each dequeue session for a subscriber must coordinate its message consumption with the other dequeue sessions of the same subscriber so that the same message is not consumed more than once by the subscriber.

As used herein, the term "single consumer queue" refers to a queue containing messages to be consumed by a single subscriber, and the term "multi-consumer queue" refers to a queue containing messages to be consumed by two or more subscribers. Single consumer queues and multi-consumer queues are described for the purpose of explanation. However, any other queue type, including any hybrid queue type, may be implemented in accordance with the disclosure.

For the purpose of explanation, it shall be assumed that each subscriber has a single dequeue session.

Dequeuing

Because any shard of a sharded queue may contain messages that must be consumed by a subscriber to that sharded queue, each subscriber to a sharded queue must process every shard of the sharded queue. The order in which the dequeue sessions of subscribers visit the shards of a sharded queue may be determined based on a variety of efficiency factors.

In one embodiment, each subscriber may simply visit each shard in a round-robin fashion. Alternatively, load balancing may be used to ensure that no shard queue becomes too overloaded with subscribers at any given time. Any one of a number of techniques may be used to determine the order in which subscribers visit shards, and the embodiments described herein are not limited to any particular one of those techniques.

When dequeuing from a shard, each subscriber tracks the subscriber's dequeuing progress using (a) a dequeue pointer and (b) partitions of a dequeue log table. With respect to the dequeue pointer, the dequeue pointer of each subscriber is maintained in volatile memory and points to the next message, within the message cache, that must be processed by the subscriber. In contrast, the dequeue log table is a durably stored structure for keeping track of the dequeue process. If a failure occurs, both the dequeue pointers and the message cache content may be lost. The dequeue pointer may be restored from low watermark (LWM) data (see section entitled "COMMIT LOW WATERMARK"), and the message cache with lock bitmap content may be restored using the dequeue log table.

The Dequeue Log Table

A dequeue log table logs all dequeues for all durable subscribers for each queue table partition i.e., subshard. This logging is on a per subscriber per message basis. Thus, there is a dequeue log physical partition per mapped queue table partition per durable subscriber. Each partition thus represents dequeues for a subscriber on a queue table partition i.e., subshard. For a single consumer queue, there is only one dequeue log partition per queue table partition. The size of the partition is same as the size of queue table partition.

Sharded queues use dequeue log table as a log to determine when to unmap (truncate) a queue table partition. The dequeue log table is also used to implement various message properties like dequeue attempts, dequeue retry-delay, etc. The dequeue log table also acts as history for the dequeues.

In one embodiment, in order to avoid any row movement/chaining on future updates, the dequeue log table is created with default values set for all columns to maximum sized values of their respective types. This is possible because almost all the columns of dequeue log table contain fixed sized elements throughout its life.

In one embodiment, dequeue commit inserts a record into the dequeue log on behalf of the subscriber and the message it successfully dequeued. However, as will be explained in greater detail hereafter, in an alternate embodiment, the sharded queue architecture populates each dequeue log subshard once and reuses rows serially.

According to one embodiment, the dequeue log table of a multi-consumer queue includes the following columns:
- message id (identifier of the message that corresponds to the row)
- shard id (identifier of the shard in which the corresponding message resides)
- sequence number (sequence number of the message within the subshard)
- version number (version of this partition row)
- dequeue time (timestamp of dequeue commit)
- transaction id (identifier of the transaction the performed the dequeue operation)
- dequeue user (schema name of the dequeuer)
- subscriber (identifier of the subscriber for whom the dequeue was performed)
- retry count (current retry count)

For a single-consumer queue, the subscriber column is not necessary, since there is only one subscriber for the queue.

Example Dequeue Log Table

Figure 5:
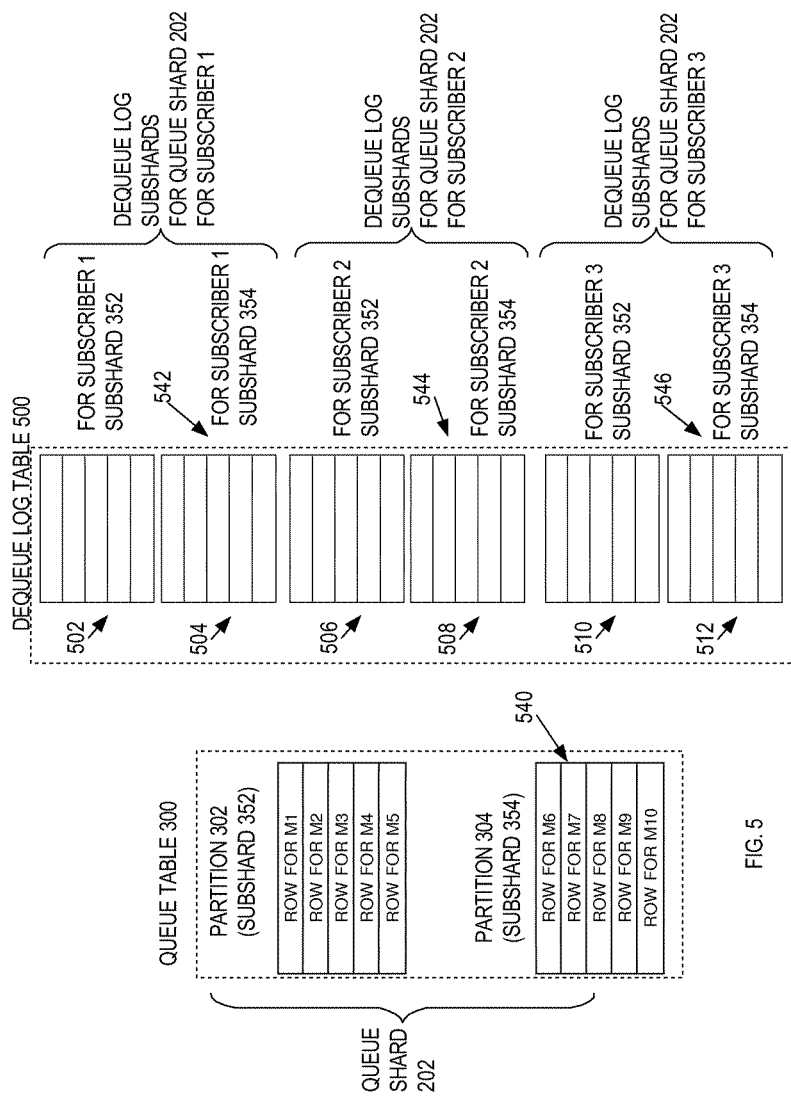
FIG. 5 is a block diagram of a dequeue log table, according to an embodiment.

FIG. 5 is a block diagram that depicts a dequeue log table 500 that is used by dequeue sessions to perform bookkeeping relative to their dequeue operations. When a queue has N subscribers at a given point in time, each active partition of the queue table has N corresponding dequeue log partitions of the same size as the queue table partition, one for each subscriber. A dequeuer updates the dequeue log to indicate it has successfully dequeued a message.

Each fixed-size partition of a dequeue log is initialized once in the background by inserting a placeholder row for each potential message in a corresponding queue table partition. Each placeholder row in a dequeue log partition has a unique sequence number column that is subsequently never updated. Each sequence number in a dequeue log partition has a single matching sequence number in the corresponding queue table partition. A session dequeuing a message will use a SQL UPDATE to modify columns other than the "sequence number" column appropriately.

In the illustrated embodiment, dequeue log table 500 is partitioned such that each subscriber is assigned one partition of the dequeue log table for each active partition of each shard from which the subscriber is dequeuing messages. Thus, if a sharded queue has X subscribers and Y shards, and each of the shards has Z active partitions of the queue table, then the total number of dequeue log table partitions currently in use to perform bookkeeping for the subscribers of the sharded queue is X*Y*Z.

Referring to FIG. 5, it illustrates a situation in which three subscribers (subscribers 1, 2 and 3) are dequeuing from shard 202. Shard 202 has two partitions (302 and 304) of queue table 300. Consequently, relative to shard 202, each of the three subscribers has two partitions of dequeue log table 500. Subscriber 1 has partition 502 to use to perform bookkeeping for partition 302 of shard 202, and partition 504 to use to perform bookkeeping for partition 304 of shard 202. Subscriber 2 has partition 506 to use to perform bookkeeping for partition 302 of shard 202, and partition 508 to use to perform bookkeeping for partition 304 of shard 202. Subscriber 3 has partition 510 to use to perform bookkeeping for partition 302 of shard 202, and partition 512 to use to perform bookkeeping for partition 304 of shard 202.

According to one embodiment, the number of rows in each partition of dequeue log table 500 is equal to the number of rows in the corresponding partition of queue table 300. For example, if partition 302 has ten thousand rows, then partitions 502, 506 and 510, respectively used by subscribers 1, 2 and 3 to perform bookkeeping for partition 302, would each have ten thousand rows. Similarly, if partition 304 has five thousand rows, then partitions 504, 508 and 512 used to perform bookkeeping for partition 304 would have five thousand rows.

Dequeue Log Table Operations

According to one embodiment, database commands are executed against the dequeue log table to use the dequeue log table to track dequeue progress. Execution of a database command, such as a SQL command, causes a database operation to be performed. Specifically, according to one embodiment, an insert operation is performed for a dequeue log table partition only during its creation i.e. add partition. The partition maintenance layer inserts the appropriate number of rows within the partition. The insert operation only inserts SEQ_NUM column, other columns are left to their default values. As the number of dequeue log partitions can be large, it is important to reduce this pre-population cost. For sharded queues, this may be done by using a 'connect by' SQL statement.

An update is performed for dequeue log table partition during dequeue on behalf of the particular subscriber to which the partition belongs. The nature of the update, as well as the use of the version number column, shall be described in greater detail below.

According to one embodiment, each fixed-size partition of the dequeue log is initialized once, in the background, by inserting a "placeholder" row for each potential message in the queue table partition that corresponds to the dequeue log partition. Each placeholder row in a dequeue log partition has a unique message sequence number in a column that is subsequently never updated. Each sequence number in the dequeue log partition has a single matching sequence number in the corresponding queue table partition. As shall be described in greater detail hereafter, each dequeue session uses a SQL UPDATE to modify columns, other than the sequence number column, when dequeuing a message.

Dequeue Pointers

According to one embodiment, each subscriber has a dequeue pointer for each shard of the sharded queue from which the subscriber is dequeuing messages. As mentioned above, the dequeue pointer for a subscriber, for a given shard, indicates the next message in the message cache available to dequeue. The dequeue pointer of a subscriber advances as the subscriber dequeues messages. If the transaction performing dequeue operations for a subscriber is rolled back, then the dequeue pointer for that subscriber moves backward to the position of the pointer at the time the transaction began. In addition, the dequeue pointer for a subscriber may move backward when a message, located at a position within the message queue that has already been passed by the dequeue pointer, is committed.

Figure 7:
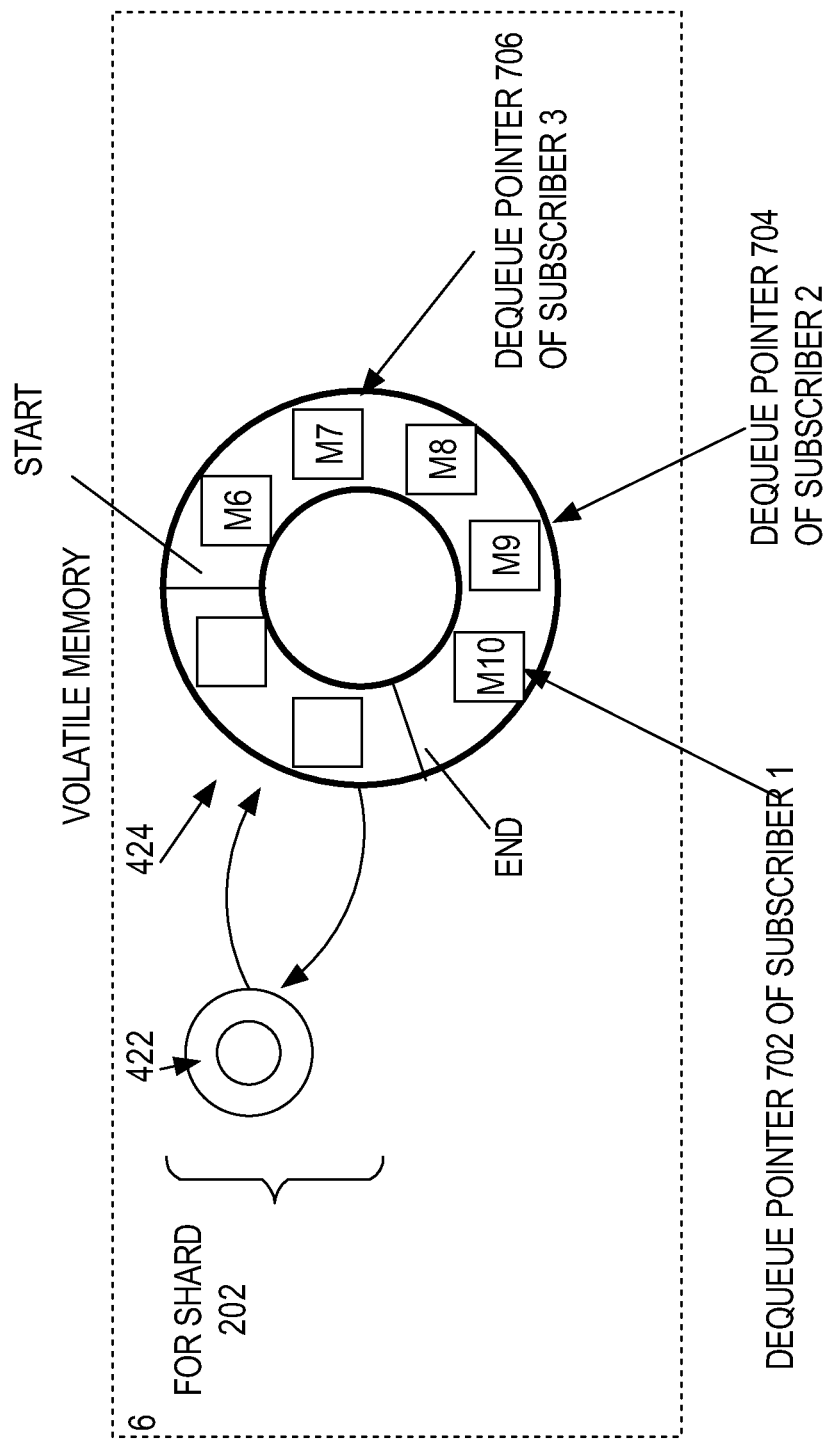
FIG. 7 is a block diagram illustrating the use of dequeue pointers to track dequeue progress of subscribers, according to an embodiment.

Referring to FIG. 7, it illustrates a scenario in which three subscribers are dequeuing messages from subshard 354 of shard 202. Circular buffer 424 corresponds to subshard 354, so the dequeue pointer of each of the subscribers indicates the position, within circular buffer 424, of the next message for the subscriber to dequeue.

Specifically, subscriber 1 has dequeued messages M6 to M9. Consequently, the dequeue pointer 702 of subscriber 1 points to the message cache entry associated with message M10. Subscriber 2 has only dequeued messages M6 to M8. Consequently, the dequeue pointer 704 of subscriber 2 points to the message cache entry associated with message M9. Subscriber 3 has only processed message M6. Consequently, the dequeue pointer 706 of subscriber 3 points to the message cache entry associated with message M7.

Commit Low Water Mark

According to one embodiment, every subscriber state contains a commit low watermark (LWM). The LWM of a subscriber represents a position within a shard below which none of the messages are of interest to the subscriber. This value is also durably stored to ensure it will not be lost in the case of a failure. In one embodiment, a LWM table is maintained on disk to track subshards that have been completely dequeued by the subscribers.

Every dequeue commit for a subscriber tries to move the watermark forward as much as possible. The commit function typically starts from the current watermark position (subshard-message) and moves it above all subsequent messages whose subscriber bit and lock bit for the particular position has value (0,1).

This movement stops on the message which does not have the above value. If, in this process, the commit watermark moves over a subshard (indicating that the subscriber has dequeued all messages in the subshard), then an indication that the subscriber has completed dequeuing the subshard is stored. When all subscribers to a shard have indicated that they have competed dequeuing a subshard, then (a) the partition(s) associated with the subshard is truncated, and (b) the circular buffer used to cache messages for the subshard can be deallocated.

Because messages cannot be processed by subscribers before the transactions enqueuing the messages are committed, all messages that precede the commit low water mark will necessarily have been committed. Therefore, there will not be any in-flight enqueuing transaction or dequeuing transaction involving a message that precedes the commit low watermark.

The global LWM (Low Water Mark) is the minimum LWM value across all subscriber LWMs for a shard. Below a global LWM of all subscribers, no messages are of interest to any subscriber. Subshards below the global LWM can therefore be deleted, unmapped or otherwise removed at any time without affecting any subscriber.

Fully-Dequeued Table-Queue Partitions

After all subscribers of a sharded queue have processed the messages of a table queue partition that belongs to the sharded queue, the table queue partition is considered "fully-dequeued". Thus, all partitions that are below the current commit low watermark are fully-dequeued table-queue partitions. According to one embodiment, rather than delete individual messages after the messages have been consumed by all subscribers, messages are deleted in batches by truncating table queue partitions that have become fully-dequeued.

According to one embodiment, once truncated, the table queue partitions are returned to a "free pool" of table queue partitions that may be reused when room is needed for new messages that need to be enqueued in the sharded queue.

Dequeue Operations

In general, a dequeue session dequeues a persistent message by temporarily marking the message in the message cache as being dequeued, and by using SQL to update the appropriate row in a dequeue log partition. A post-commit callback updates the state of dequeued messages in the message cache.

According to one embodiment, the dequeue operations for a subscriber include:
- Iterating over all messages from the dequeue pointer of the subscriber,
- Determining whether each message has already been dequeued by the subscriber,
- Determining whether the message satisfies the message selection conditions, if any, associated with the subscriber,
- Sending to the subscriber each message that (a) satisfies the message selection conditions and (b) has not already been dequeued by the subscriber.
- Temporarily marking each message in the message cache as being dequeued by the subscriber
- Updating the appropriate row in the appropriate dequeue log partition; and
- Making a post-commit callback to update the state of the dequeued messages in the message cache Returning to FIG. 5, each message that is stored in sharded queue 200 corresponds to the one row in queue table 300. For example, a message M7 that is enqueued in sharded queue 200 may be stored in row 540. As illustrated in FIG. 5, row 540 is the second row in partition 304 of queue table 300.

When a subscriber successfully dequeues a persistent message, the subscriber updates its dequeue log to indicate that it has successfully dequeued the message. Specifically, the subscriber updates the row, within its dequeue log, that corresponds to the row, of the queue table, for the dequeued message. In addition, the subscriber temporarily marks the message in the message cache as being dequeued.

In the present example, after dequeuing message M7, subscriber 1 would update row 542 of partition 504, which is the dequeue log row, for subscriber 1, that corresponds to row 540 of partition 304. Similarly, after dequeuing message M7, subscriber 2 would update row 544 of partition 508, which is the dequeue log row, for subscriber 2, that corresponds to row 540 of partition 304. After dequeuing message M7, subscriber 3 would update row 546 of partition 512, which is the dequeue log row, for subscriber 3, that corresponds to row 540 of partition 304.

Dequeue Commit

When a transaction that has dequeued messages for a subscriber commits, a post-commit callback operation is performed to update the state of the dequeued messages in the message cache. Specifically, in one embodiment, the following operations are performed on dequeue commit.
- For the bit position of the subscriber for the message set the subscriber bitmap bit to 0 and lock bitmap bit to 1.

Try to move the commit low water mark forward from its current position. A commit low water mark can be moved over a message if the subscriber bit is 0 and lock bit is set to 1.

If the transaction commit completed the dequeue of a subshard, store the subshard number within the LWM table on disk. This indicates all messages below the updated subshard number are not of interest to the subscriber for the shard.

Dequeue Rollback

In the case that a dequeue session cannot commit, the dequeue session may be rolled back. According to one embodiment, the following operations are performed on a dequeue rollback:

For the bit position of the subscriber for the message, set the lock bitmap bit to 0 indicating initial state of the message.

Reset the subscriber's dequeue pointer to this message only if the subscriber's dequeue pointer is ahead of the message.

Recycling/Reuse of Queue Partitions

As mentioned above, when a new queue table partition is needed to store incoming messages, the partition is obtained from a free pool if the free pool is not empty. Queue table partitions are added to the free pool when the messages they contain have been fully dequeued.

Specifically, according to one embodiment, partitions of the queue table are cycled from state "unmapped/free" to "mapped/in-use" to "unmapped/free" like reusable resource units from a pool. Once all the subscribers have dequeued a subshard, the partition mapped to the subshard is truncated and made available for reuse by a future subshard at the same instance.

Truncating Queue Table Partitions

When a dequeue commit happens, and the transaction was such that it switched at least one subshard within the transaction, i.e. dequeued across at least two subshards, then the commit time callback stores an indication that the corresponding subscriber has completed the dequeue of the subshard. If the dequeuer was the final subscriber that needed to dequeue from the subshard which it switched from during the transaction, then that subshard could be freeable and truncatable.

On receiving the indication, a background process re-calculates, such as from existing subscriber commit LWMs, the global LWM for the shard. If there is something which is found freeable below the global LWM (which indicates the subshard below which everything is dequeued), then a background process frees the subshards and truncates the partitions mapped to those subshard.

According to one embodiment, a SELECT FOR UPDATE query is used to capture all the partitions in the queue table map which are mapped and are below the Global Minimum LWM. The truncate is done in a batch, using multi-partition truncate DDL, providing a list of partitions to alter table truncate. While results of above SELECT query are iterated, the batch of partition names is constructed, and the update is done after each fetch to unmap the partition i.e. to unmark the shard, priority, subshard and map_time columns of the partition record.

When the batch size is reached during the iterations, the constructed partition list is passed to the truncate function to do batch truncate in an autonomous transaction. If the above query fetches further rows after this batch, again the next list is constructed, and batch truncated similarly.

Unmapping Queue Table Partitions

An update is done on each fetch of the SELECT query, mentioned above, to unmap the partition i.e. to unmark the shard, priority, subshard and map_time columns of the partition record. While the SELECT fetched all rows/partitions below the Global Minimum LWM and all are truncated, a commit is issued which will commit the update statement which unmapped the partition record. Each truncate DDL was committed immediately with an autonomous transaction.

Reusing Queue Table Partitions

Once partitions are unmapped, they satisfy the condition of the SQL query which loads free partitions from the dictionary to refill the prefetch cache. On next prefetch refill query they are picked up using ORDER BY and put towards the head of the prefetch cache so that they can be reused.

The partitions are made available to reuse quickly by using ORDER BY and putting into the consuming end of the cache, so that the queue can be served using the minimum number of distinct partitions possible, for the benefits of locality of reference, cache trails, etc of recently used resource.

Overview of Reuse of Dequeue Log Partitions

According to one embodiment, the dequeue log table includes a VERSION column that permits serial reuse of dequeue log partitions without the need for a SQL TRUNCATE or SQL UPDATE on the dequeue log partition each time the dequeue log partition is reused.

Specifically, when a dequeue log partition is created, a "0" is stored in the VERSION column of every row in the partition. In addition, metadata is stored in a data dictionary to indicate that "1" is the current version of the partition. Each time a dequeue log partition is reused, the version number for the dequeue log partition is updated in the data dictionary. Thus, when the dequeue log partition is reused for the first time, the version number will be updated to "2", and when reused for the second time the version number will be updated to "3".

Any row within a dequeue log partition whose VERSION column is less than the version identified for that dequeue log partition in the data dictionary is treated as empty. Thus, if a dequeue log partition has five rows, and the VERSION column of those rows respectively contain the values 2, 2, 1, 0, 2, and the current version of the dequeue log partition is "2", then the third and fourth rows within the dequeue log partition are treated as empty.

When a dequeue log partition is no longer in use, the current version number for the dequeue log partition, which is maintained in the data dictionary, is incremented by 1. Incrementing the current version effectively invalidates all rows currently in the dequeue log partition.

Because the current version number is incremented with each reuse of the corresponding dequeue log partition, there is a possibility that the version number will eventually "overflow". According to one embodiment, to prevent such overflow, a background process may use a database transaction to both (a) reset the current version to 1, and (b) update the VERSION column of all rows within the partition to "0".

Recycling/Reuse of Dequeue Log Partitions

As explained above, recycling/reuse of dequeue log partitions is very different from how queue table partitions are recycled. Specifically, dequeue log partitions are not reused using a conventional truncate DDL. Since a fixed number of same shape records, containing all fixed sized columns, is what is stored in dequeue log partitions, the dequeue log is designed to be reused without expensive truncate DDLs.

The dequeue log stores one row per message, per subscriber. Subshard-size number of rows is the maximum number of rows which can be stored in a dequeue log partition. In one embodiment, the default subshard size is 2000. One row per message is logged with the sequence number of the message as the key.

At partition creation time, 2000 empty rows are inserted into a dequeue log partition with just the sequence number column inserted. Using this sequence number column, a session dequeuing a message does not insert a dequeue log record, but updates an existing empty row in the dequeue log. This update over previous rows is used in subsequent reuse of dequeue log partitions, to reuse the partition without truncate.

Dequeue Log Partition Pre-Population

When a dequeue log partition is created, in the same transaction empty rows are inserted in the partition. For the purpose of explanation, it shall be assumed that the dequeue log partition has 2000 rows. At this point, only the values 0 to 1999 are inserted into the seq_num column. The 2000 rows form a place holder for the dequeue log information which will be updated into these rows during dequeues. No later insert is required.

According to one embodiment, there is only one index on the dequeue log, and it is on the seq_num column. Since the sequence number is inserted during pre-population, the index on whole partition is created during pre-population which happens in most cases in a background process. This index, once built, is not required to be maintained rest of the life of the partition because the seq_num column is never changed. So on each reuse of a dequeue log partition, new dequeue log records are updated into the partition, but the index is not required to be maintained during foreground dequeue operations.

Dequeue Log Partition Reuse Using Row Markers

According to one embodiment, the metadata record of each dequeue log partition (in the dequeue-log partition map table) has a column which stores a value called row marker for the partition. When a partition is created, the value is initially 1.

The dequeue log table also has a VERSION column. The value stored in this column in a record indicates whether a dequeue log row is virtually present in this record or not.

If a dequeue log VERSION column in a row of a dequeue log partition is "marked" with the row marker value in its metadata, then it signifies that the subscriber has dequeued the corresponding message.

When dequeue log information for a message is updated into a record in the prepopulated dequeue log partition, the present Row Marker of the partition from its metadata is stored into the VERSION column of the dequeue log record.

While looking to check if a message is dequeued by a subscriber or not e.g., by reload, etc, the row marker value of the partition is picked from the metadata and each row of dequeue log partition is checked for this row marker value. If the row marker is found in the row, the message is dequeued (dequeue log row is present).

When a dequeue log partition is truncatable, the partition is not actually truncated. The rows are left just as is, but the row marker in the partition metadata in partition map is incremented from its previous value. The row marker can have several values to signify the status of the message for the subscriber. In one embodiment, the value starts from 1 and on next reuse of the partition is incremented by 5.

A row in a partition can have a version value as an offset from corresponding row marker stored in dequeue-log partition map table. The following are the offset values:
- 0=dequeue committed
- 1=this message is not qualified for this non-durable subscriber
- 2=background process committed this message
- 3=message rolled backed and retry updated
- 4=message reached maximum retries
- 5=truncate marker offset: The final offset version representing next legitimate row marker and version value. This offset represents reuse of the dequeue-log partition.

When a truncatable partition is unmapped, its row marker value in metadata is incremented. The existing rows in the partition virtually disappear because the reader expects the new incremented row marker value in the rows for a valid row. Thus all old rows with smaller values of row marker are interpreted as not present.

Row Marker Wraparound

Since the row marker is incremented on every truncate and a partition can be reused an indefinite number of times, the row marker cannot be incremented indefinitely, because it will reach the upper value of its storage. This row marker is reset to its start value i.e. 1 after a fixed number of reuse cycles. When the row marker is reset to 1, the VERSION column of all 2000 rows is set to zero. This is required to be done, because there could be still some rows which, for example, were updated only by the first use of partition with first time value of row marker=1, and now after wraparound on second time value of row marker=1, those old rows might look like dequeued on current usage of the partition.

Unmapping Dequeue Log Partitions

A dequeue log partition is unmapped when the parent queue table partition is being truncated, and a cascaded truncate/free is called on all associated dequeue log partitions (of all subscribers). When the dequeue log partitions are unmapped, row marker update is done. Row marker reset is also done, if necessary.

In one embodiment, all these SQL updates during dequeue log partition unmap are committed only if (in same transaction of) the outer queue table parent partition unmap is committed.

Recycling/Reuse of Dequeue Log Partitions

Once dequeue log partitions are unmapped, they satisfy the condition of the SQL query which loads information about free partition from the dictionary to refill the prefetch cache. On the next prefetch refill query, partitions are picked up using ORDER BY and put towards the head of the prefetch cache, so that they can be reused.

The dequeue log partitions are made to be reused quickly by using ORDER BY and putting into the consuming end of the cache, so that the queue can be served using a minimum number of distinct partitions, for the benefits of locality of reference, cache trails, etc. of a recently used resource.

Non-Persistent Messages

In the previous sections, embodiments have been described in which messages in the queue persist on disk until all messages in the queue have been consumed by all subscribers, or until the queue has been removed. However, non-persistent messages are maintained only in the message cache, and not durably stored in any disk table (e.g. the queue table or dequeue-log table).

Indexes

According to one embodiment, the queue table used to implement a sharded queue is not indexed. On the other hand, the dequeue log table has a local partitioned index that is populated when a partition is initialized in the background, as explained above. An index partition does not change subsequently, because the dequeue session modifies only nonindexed columns in the dequeue log. Index contention and index maintenance overhead are thus avoided.

Crash Recovery

When a database instance is started after an instance crash or a normal shutdown, for each sharded queue a SQL SELECT command is issued with an ORDER BY clause on each nonempty partition of the queue table. This SQL SELECT statement reads all not-yet-dequeued messages from the queue table into the message cache. A SQL SELECT command is also issued on each non-empty dequeue log partition, to load the information contained therein into cache.

Java Message Service Queues

The sharded queues described herein may be used to implement JMS queues. Sharded queues completely support JMS. Point-to-point queues as well as publish-subscribe topics are supported.

Nonpersistent JMS messages are implemented like persistent JMS messages, but do not use the queue table and dequeue log table. Message listeners can be supported by having an existing message listener mechanism iterate over all shards.

Nondurable JMS subscribers are implemented like durable JMS subscribers, but keep their metadata only in volatile memory. Nondurable subscribers do not log dequeue operations in the dequeue log.

In one embodiment, a nondurable subscriber evaluates its rule when deciding whether a message is eligible for dequeue. However, in alternative embodiments, this evaluation could also be done at enqueue time or in the background.

Like durable subscribers, a nondurable subscriber uses an entry in the subscriber bitmap to indicate whether the subscriber is dequeuing or has dequeued a message.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
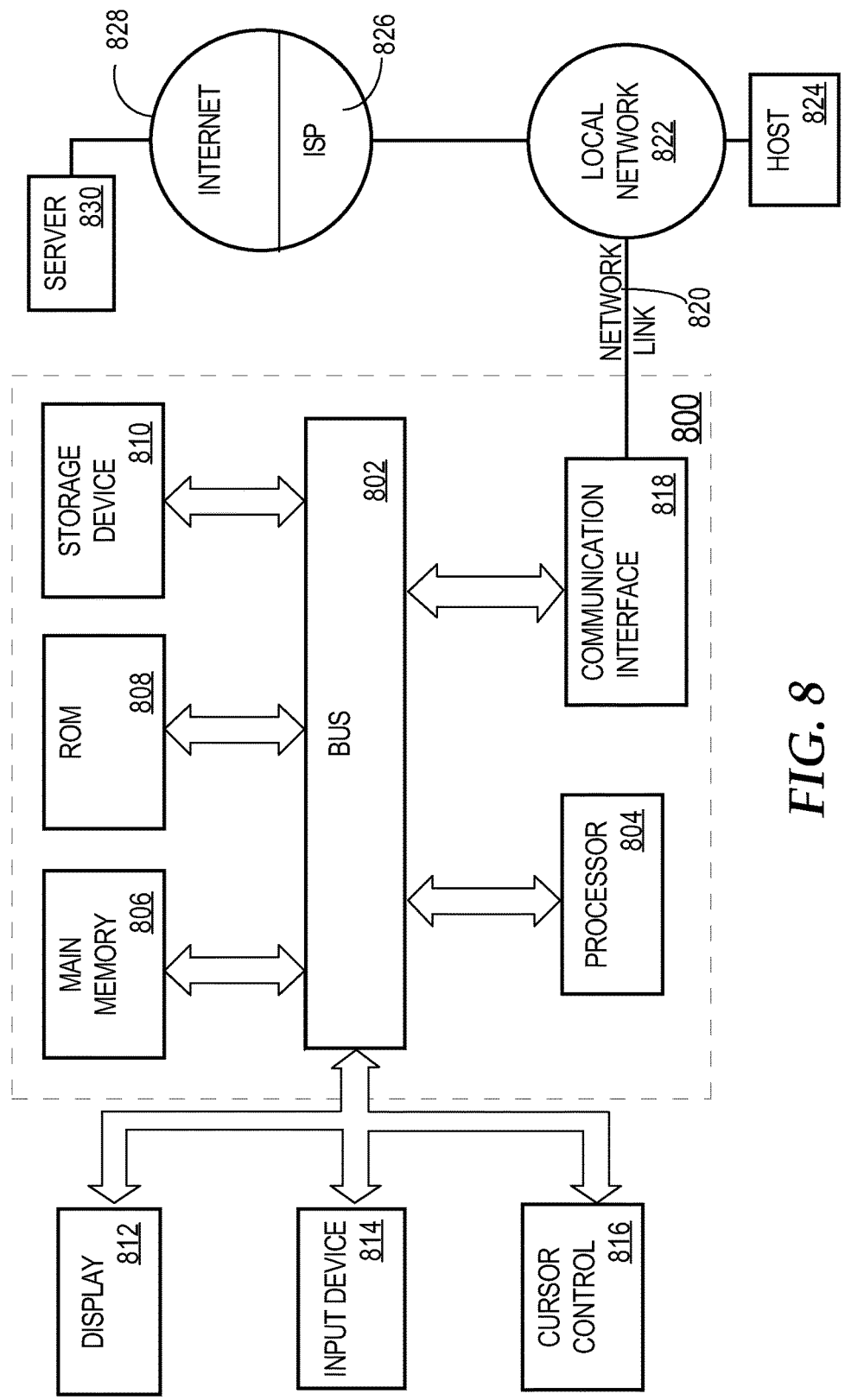
FIG. 8 illustrates a computer system upon which one or more embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing messages from a plurality of enqueuers of a particular queue in a plurality of shards of the particular queue;
    wherein, within each shard, messages are ordered relative to all other messages in the shard based on their respective enqueue times;
    wherein the particular queue is implemented using a queue table maintained by a relational database system;
    wherein each shard of the plurality of shards is assigned one or more rows of the queue table maintained by the relational database system;
    wherein the plurality of enqueuers includes a first enqueuer and a second enqueuer;
    wherein storing messages from the plurality of enqueuers includes:
        storing all messages from the first enqueuer in first one or more rows of the queue table that are assigned to a first shard of the plurality of shards, and
        storing all messages from the second enqueuer in second one or more rows of the queue table that are assigned to a second shard of the plurality of shards,
        wherein the first one or more rows of the queue table are different from the second one or more rows of the queue table,
        wherein one or more messages from the first enqueuer and one or more messages from the second enqueuer are for a particular subscriber of the particular queue;
    dequeuing messages, from the particular queue, for the particular subscriber by dequeuing messages, for the particular subscriber, from both the first shard and the second shard;
    wherein the method is performed by one or more computing devices.

2. The method of claim 1 wherein:
    each shard is assigned one or more partitions of the queue table;

storing all messages from the first enqueuer in first one or more rows of the queue table that are assigned to the first shard includes:
  for each message from the first enqueuer, a database server associated with the relational database system executing a database command to insert a row in a partition of the queue table that has been assigned to the first shard,
  wherein the first one or more rows comprises each row inserted for the messages from the first enqueuer.

3. The method of claim 1 further comprising:
maintaining, in volatile memory, a message cache for each shard of the plurality of shards;
wherein maintaining the message cache for each shard includes maintaining a first message cache for the first shard in volatile memory; and
for each message from the first enqueuer, storing an entry for the message in the first message cache.

4. The method of claim 3 wherein dequeuing messages, from the particular queue, for the particular subscriber comprises:
  dequeuing a particular message enqueued by the first enqueuer by reading the entry for the particular message from the first message cache without executing a database command to access any partition of the queue table.

5. The method of claim 3 wherein:
the first enqueuer enqueues one or more messages in the particular queue using a database transaction;
the one or more messages correspond to one or more particular entries in the first message cache;
before the database transaction commits, the entries corresponding to the one or more messages in the first message cache include an indication that the one or more messages are not visible to dequeuers; and
the method further comprises: in response to detecting commitment of the database transaction, updating each entry of the one or more particular entries to indicate that the message that corresponds to the entry is visible to dequeuers.

6. The method of claim 5 wherein:
a particular entry, of the one or more particular entries, in the first message cache corresponds to the first message enqueued as part of the database transaction; and
the method further comprises resetting, to the particular entry, one or more dequeue pointers that are past the particular entry, within the first message cache, at the time the database transaction commits.

7. The method of claim 1 wherein a dequeue log table, maintained by the relational database system, stores, within partitions of the dequeue log table, tracking information that tracks dequeue progress of subscribers dequeuing messages from the particular queue.

8. The method of claim 7 further comprising:
in response to the particular subscriber dequeuing a message that corresponds to a given row in a given partition of the queue table, updating a particular row in a particular partition of the dequeue log table;
wherein the particular row corresponds to the given row, and the particular partition corresponds to the given partition.

9. The method of claim 8 further comprising, after a failure, rebuilding a message cache for the first shard in volatile memory based, at least in part, on contents of the dequeue log table.

10. The method of claim 1 further comprising:
when all subscribers of the particular queue have dequeued all messages that correspond to a particular partition of the queue table, truncating the particular partition and placing the particular partition in a free pool; and
when a message is to be stored in a shard whose currently assigned queue table partitions are full, assigning a partition from the free pool to the shard.

11. The method of claim 8 further comprising:
maintaining a version value for the particular partition of the dequeue log table;
wherein updating the particular row in the particular partition of the dequeue log table comprises storing the version value in the particular row; and
in response to detecting that all messages, for the particular subscriber have been dequeued from the given partition of the queue table that corresponds to the particular partition of the dequeue log table, incrementing the version value for the given partition.

12. One or more non-transitory computer-readable media storing one or more sequences of instructions which, when executed by one or more processors, cause:
  storing messages from a plurality of enqueuers of a particular queue in a plurality of shards of the particular queue;
  wherein, within each shard, messages are ordered relative to all other messages in the shard based on their respective enqueue times;
  wherein the particular queue is implemented using a queue table maintained by a relational database system;
  wherein each shard of the plurality of shards is assigned one or more rows of the queue table maintained by the relational database system;
  wherein the plurality of enqueuers includes a first enqueuer and a second enqueuer;
  wherein storing messages from the plurality of enqueuers includes:
    storing all messages from the first enqueuer in first one or more rows of the queue table that are assigned to a first shard of the plurality of shards, and
    storing all messages from the second enqueuer in second one or more rows of the queue table that are assigned to a second shard of the plurality of shards,
    wherein the first one or more rows of the queue table are different from the second one or more rows of the queue table,
    wherein one or more messages from the first enqueuer and one or more messages from the second enqueuer are for a particular subscriber of the particular queue;
  dequeuing messages, from the particular queue, for the particular subscriber by dequeuing messages, for the particular subscriber, from both the first shard and the second shard.

13. The one or more non-transitory computer-readable media of claim 12, wherein:
each shard is assigned one or more partitions of the queue table;
storing all messages from the first enqueuer in first one or more rows of the queue table that are assigned to the first shard includes:
  for each message from the first enqueuer, a database server associated with the relational database system executing a database command to insert a row in a partition of the queue table that has been assigned to the first shard, wherein the first one or more rows comprises each row inserted for the messages from the first enqueuer.

14. The one or more non-transitory computer-readable media of claim 12, wherein the one or more sequences of instructions further comprises instructions which, when executed by one or more processors, cause:
maintaining, in volatile memory, a message cache for each shard of the plurality of shards;
wherein maintaining the message cache for each shard includes maintaining a first message cache for the first shard in volatile memory; and
for each message from the first enqueuer, storing an entry for the message in the first message cache.

15. The one or more non-transitory computer-readable media of claim 14, wherein the one or more sequences of instructions further comprises instructions which, when executed by one or more processors, cause:
dequeuing a particular message enqueued by the first enqueuer by reading the entry for the particular message from the first message cache without executing a database command to access any partition of the queue table.

16. The one or more non-transitory computer-readable media of claim 14, wherein:
the first enqueuer enqueues one or more messages in the particular queue using a database transaction;
the one or more messages correspond to one or more particular entries in the first message cache;
before the database transaction commits, the entries corresponding to the one or more messages in the first message cache include an indication that the one or more messages are not visible to dequeuers; and
wherein the one or more sequences of instructions further comprises instructions which, when executed by one or more processors, cause, in response to detecting commitment of the database transaction, updating each entry of the one or more particular entries to indicate that the message that corresponds to the entry is visible to dequeuers.

17. The one or more non-transitory computer-readable media of claim 16, wherein:
a particular entry, of the one or more particular entries, in the first message cache corresponds to the first message enqueued as part of the database transaction; and
wherein the one or more sequences of instructions further comprises instructions which, when executed by one or more processors, cause resetting, to the particular entry, one or more dequeue pointers that are past the particular entry, within the first message cache, at the time the database transaction commits.

18. The one or more non-transitory computer-readable media of claim 12, wherein a dequeue log table, maintained by the relational database system, stores, within partitions of the dequeue log table, tracking information that tracks dequeue progress of subscribers dequeuing messages from the particular queue.

19. The one or more non-transitory computer-readable media of claim 18, wherein the one or more sequences of instructions further comprises instructions which, when executed by one or more processors, cause:
in response to the particular subscriber dequeuing a message that corresponds to a given row in a given partition of the queue table, updating a particular row in a particular partition of the dequeue log table;
wherein the particular row corresponds to the given row, and the particular partition corresponds to the given partition.

20. The one or more non-transitory computer-readable media of claim 19, wherein the one or more sequences of instructions further comprises instructions which, when executed by one or more processors, cause, after a failure, rebuilding a message cache for the first shard in volatile memory based, at least in part, on contents of the dequeue log table.

21. The one or more non-transitory computer-readable media of claim 12, wherein the one or more sequences of instructions further comprises instructions which, when executed by one or more processors, cause:
when all subscribers of the particular queue have dequeued all messages that correspond to a particular partition of the queue table, truncating the particular partition and placing the particular partition in a free pool; and
when a message is to be stored in a shard whose currently assigned queue table partitions are full, assigning a partition from the free pool to the shard.

22. The one or more non-transitory computer-readable media of claim 19, wherein the one or more sequences of instructions further comprises instructions which, when executed by one or more processors, cause:
maintaining a version value for the particular partition of the dequeue log table;
wherein updating the particular row in the particular partition of the dequeue log table comprises storing the version value in the particular row; and
in response to detecting that all messages, for the particular subscriber have been dequeued from the given partition of the queue table that corresponds to the particular partition of the dequeue log table, incrementing the version value for the given partition.

23. The method of claim 1 wherein:
each shard comprises one or more subshards;
each subshard is assigned one or more rows, of the queue table, that are assigned to the corresponding shard;
storing all messages from the first enqueuer in first one or more rows of the queue table that are assigned to the first shard includes storing each message from the first enqueuer in a respective row of the queue table that is assigned to a subshard of the first shard;
storing all messages from the second enqueuer in second one or more rows of the queue table that are assigned to the second shard includes storing each message from the second enqueuer in a respective row of the queue table that is assigned to a subshard of the second shard.

24. The one or more non-transitory computer-readable media of claim 12, wherein:
each shard comprises one or more subshards;
each subshard is assigned one or more rows, of the queue table, that are assigned to the corresponding shard;
storing all messages from the first enqueuer in first one or more rows of the queue table that are assigned to the first shard includes storing each message from the first enqueuer in a respective row of the queue table that is assigned to a subshard of the first shard;
storing all messages from the second enqueuer in second one or more rows of the queue table that are assigned to the second shard includes storing each message from the second enqueuer in a respective row of the queue table that is assigned to a subshard of the second shard.

25. The method of claim 1, wherein, within a particular shard of the plurality of shards, messages are ordered independent from the ordering of messages in other shards of the plurality of shards.

26. The one or more non-transitory computer-readable media claim 12, wherein, within a particular shard of the plurality of shards, messages are ordered independent from the ordering of messages in other shards of the plurality of shards.

\* \* \* \* \*

UNITED STATES PATENT AND TRADEMARK OFFICE
CERTIFICATE OF CORRECTION

PATENT NO. : 9,792,349 B2  
APPLICATION NO. : 14/095543  
DATED : October 17, 2017  
INVENTOR(S) : Bose et al.

Page 1 of 1

It is certified that error appears in the above-identified patent and that said Letters Patent is hereby corrected as shown below:

On page 2, Column 1, under Other Publications, Line 4, delete "Action Action," and insert -- Action, --, therefor.

In Column 4, Line 48, delete "shard," and insert -- shard. --, therefor.

In Column 16, Line 28, delete "subscriber." and insert -- subscriber, --, therefor.

In Column 16, Line 30, after "subscriber" insert -- , --.

In Column 16, Line 34, after "cache" insert -- . --.

In Column 29, Line 2, in Claim 26, after "media" insert -- of --.

Signed and Sealed this  
Twelfth Day of June, 2018

Andrei Iancu  
*Director of the United States Patent and Trademark Office*